Figure 1:
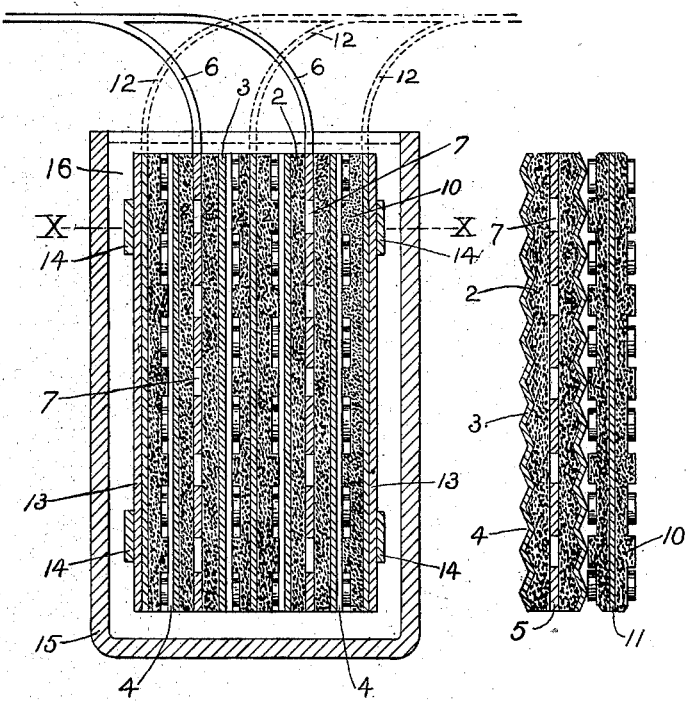

No. 736,390. PATENTED AUG. 18, 1903.
G. E. HATCH.
SECONDARY BATTERY.
APPLICATION FILED JULY 14, 1899.
NO MODEL.

WITNESSES
W. E. Ellis
M. B. Wilson

INVENTOR
George E. Hatch,
By his Attorney
E. D. Chadwick

No. 736,390. Patented August 18, 1903.

UNITED STATES PATENT OFFICE.

GEORGE E. HATCH, OF QUINCY, MASSACHUSETTS, ASSIGNOR, BY MESNE ASSIGNMENTS, TO THE HATCH ACCUMULATOR COMPANY, OF KITTERY, MAINE, AND BOSTON, MASSACHUSETTS, A CORPORATION OF MAINE.

SECONDARY BATTERY.

SPECIFICATION forming part of Letters Patent No. 736,390, dated August 18, 1903.

Application filed July 14, 1899. Serial No. 723,753. (No model.)

*To all whom it may concern:*

Be it known that I, GEORGE E. HATCH, a citizen of the United States, residing at Quincy, in the county of Norfolk and State of Massachusetts, have invented certain new and useful Improvements in Secondary Batteries, of which the following is a specification.

My invention relates to secondary batteries, and more particularly to batteries of that type in which porous supports are used for carrying or confining the active material in whole or in part.

A main object of my invention is to produce a secondary battery capable of being charged and discharged at a very high rate without injury to itself and without loss of efficiency during the discharge.

A further object is to provide a battery of reduced weight and cost in proportion to its capacity and efficiency as compared with those hitherto employed.

It has been found in practice that those secondary batteries in which the active material is confined by porous supports are subject to a considerable increase of internal resistance and decrease of voltage during discharge, especially when the rate of discharge is high, and it has also been found that a main cause of these disadvantages is the exhaustion of the acid from the electrolyte, which is diffused through the active material more rapidly than it can be renewed from the outside surrounding fluid by percolation through the porous supports. A further cause is the accumulation of gases generated by the discharge of the battery, which gases, unless their free escape is in some way provided for, gather in the pores of the active material and porous supports and exert an electromotive force which is counter to that of the battery itself.

My present invention is intended to overcome the above objections, and to that end I employ rigid porous supports for the active material of the positive-pole electrodes only, and I combine therewith negative-pole electrodes so constructed or arranged that their chemically-active surfaces or the greater portion thereof will be freely and directly exposed to the contact and action of the electrolyte without the interposition of an inert porous mass through which the electrolyte must percolate in order to reach said surfaces, and through which the gases generated at that electrode must pass in order to escape from the cell.

A preferred form of battery embodying my invention is illustrated in the accompanying drawings, in which—

Figures 2, 3:
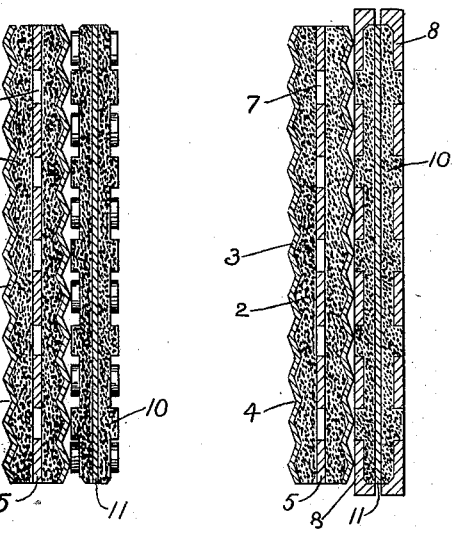
Figure 4:
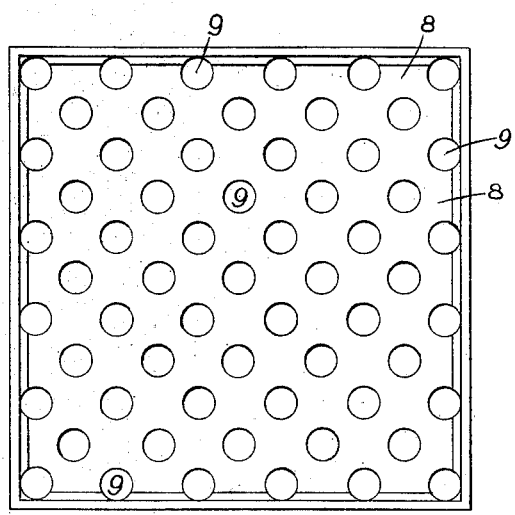

Figure 1 is a vertical transverse section through one cell of a battery. Fig. 2 is a horizontal section on the line $x \, x$ in Fig. 1, but showing only one positive and one negative electrode. Fig. 3 is a view similar to Fig. 2, illustrating one of the steps in the process which I prefer to employ in constructing my battery. Fig. 4 is a face view of a temporary support hereinafter described.

In the secondary battery shown in the drawings the active material 2 of the positive-pole electrodes is shown as applied to and supported by rigid porous support-plates 3, which should be made of kaolin or similar acid-resisting material containing no iron and each of which is preferably corrugated in one direction, thereby providing a number of parallel grooves 4. These grooves are filled on one side of the support with the active material 2 or material adapted to become active when the battery is charged. Red lead is commonly used for the purpose and may be applied to the supports 3 in the form of a paste in the manner well known in the art. To form a positive-pole electrode, two such loaded support-plates are placed one on each side of a conducting-plate 5, which is made from suitable acid-resisting material, such as metallic lead. Since these plates 5 have no supporting function, they may be made very thin, thereby economizing in weight and cost, and are cut to correspond in size with the adjacent parts of the cell, an upwardly-projecting strip 6 being left on each of them to serve as a means of connection with the other plates.

If desired, the plates 5 may be provided with a number of pockets or perforations 7, which are intended to become filled with the electrolyte, and thus to act as reservoirs thereof in direct contact and communication with the active material 2, ready to supply the same with acid when the drain is unusually heavy, as in the case of an excessively high discharge. It will be understood that these receptacles 7 are never filled with the active material and do not in any sense assist in supporting the same.

In constructing the negative-pole electrodes of my battery I proceed, preferably, according to the following process: I provide a temporary receptacle or support adapted to receive a shallow layer of red lead or equivalent active material, which support is preferably given the form of a shallow tray 8, made of light porous wood and provided with a number of holes 9, piercing its bottom. The material 10, which is to become active, is filled into the tray 8 and holes 9 until it is level or slightly more than level with the edges of said tray, and a thin plate of suitable material, such as metallic lead, which is to become the corresponding conducting-plate 11, is then placed against the filled side of the support 8. When it is desired that the plate 11 shall have active material on both its faces, as is usually the case, a filled support 8 is placed on each side of said plate.

The parts just described are now suitably confined together and the material 10 is reduced to the proper active condition. I prefer to accomplish this result by assembling a sufficient number of unformed positive and negative electrodes in pairs to constitute a complete cell, (one such pair being shown in Fig. 3,) immersing the same in a vessel of battery electrolyte and then passing a current of electricity through the temporary cell thus built up, whereby all the electrodes are "formed" at once. The material 10 is exposed to the action of the electrolyte by means of the holes 9 and also by reason of the porosity of the trays 8, and I have discovered that the material 10 when originally composed chiefly of lead oxid will be reduced by the preliminary forming process above described to the condition of a firm coherent plate of porous or spongy metallic lead, which will be wholly self-supporting, so far as its own weight is concerned, and will not be disintegrated or otherwise injured by subsequent chargings and dischargings and from which the temporary support 8 may be separated entirely, leaving an integral and coherent mass or plate of active material in contact with its conducting-plate 11 and ready for use in a battery-cell. Therefore after the preliminary forming process has been completed I separate the elements of the temporary cell, strip the temporary supports 8 from the corresponding masses of reduced active material, and finally assemble the complete positive and negative electrodes in the usual manner to form a cell in its final form, containing as many couples as may be desired.

The temporary supports may be used over again many times when made of wood, as they may be removed without injury from the reduced material 10.

In assembling the parts above described the porous support-plates 3 are placed in direct contact with the exposed active material and preferably with their grooves vertical in order to provide a free passage upward for the escape of the gases generated by the action of the cell. The plates 11, like the plates 5, are cut to correspond with the adjacent parts of the cell and are provided with similar projecting strips 12. These strips 12 are located on one side of the cell and joined together to form one pole thereof, and the corresponding strips 6 on the plates 5 are located on the opposite side of the cell and similarly joined together to form the other pole. The couples may be held together by means of backs 13, of glass, slate, paraffined wood, or equivalent acid-proof material, placed on the opposite faces of the combined element and held thereto by rubber bands 14, passed around the element. When the cells are large, the bands 14 may be made of lead and provided with small rubber buffers beneath them. The structure is thus made integral and permanent in form, while at the same time it is capable of sufficient expansion and contraction to satisfy the conditions of use. The combined element is of course suitably supported in a receptacle 15, containing the usual electrolyte 16, and any desired number of such cells may be combined in the usual manner.

It will be seen that the porous supports 3 of my battery not only serve to support the active material of the positive-pole electrodes, but also give rigidity and lateral support to both the positive and negative electrodes and insulate them from each other, thus absolutely preventing "buckling" and short-circuiting. My invention also provides for a very free circulation of the electrolyte and for the instant escape of the gases generated, which are produced for the most part at the negative-pole electrodes, and in my battery pass directly from the same into the vertical grooves in the supports 3 and thence upward out of the cell.

It is to be understood that my invention is not limited to the use of any specific form or method of construction of negative-pole electrode, provided such electrode can be held between the support-plates with its chemically-active surface freely and directly exposed to the electrolyte and without danger of injurious disintegration of such surface.

I claim as my invention—

1. In a secondary battery, the combination with an electrode comprising a porous, non-conducting support loaded on one side with active material, and a conducting-plate in contact with said active material, of an electrode of opposite polarity having its chemically-active surface directly exposed to the action of the electrolyte, and laterally supported by said porous support, spaces being provided between the latter electrode and said support, for the purpose set forth.

2. In a secondary battery, the combination with an electrode comprising a porous, nonconducting support loaded on one side with active material and provided on its other side with a series of ribs, and a conducting-plate in contact with said active material, of an electrode of opposite polarity having its chemically-active surface directly exposed to the action of the electrolyte, and laterally supported by the ribbed face of said porous support, in contact therewith.

3. A secondary-battery element comprising, in combination, a series of positive-pole electrodes each composed of a pair of corrugated porous support-plates loaded on their opposed faces with active material, and a conducting-plate held between said loaded faces in contact therewith, and a series of negative-pole electrodes having their chemically-active surfaces directly opposed to the action of the electrolyte, and held respectively between a pair of said positive-pole electrodes, in contact with the unloaded faces of said porous plates and laterally supported thereby.

4. A secondary-battery element comprising a series of positive-pole electrodes each composed of porous support-plates loaded on their opposed faces with active material, and a conducting-plate held between said loaded faces in contact therewith, in combination with a series of negative-pole electrodes each provided with a surface of spongy lead which is directly exposed to the electrolyte, and held between and laterally supported by the unloaded faces of said support-plates, spaces or channels being provided between the latter and said negative-pole electrodes.

5. A secondary-battery element comprising a series of positive-pole electrodes each composed of porous support-plates loaded on their opposed faces with active material and provided on their unloaded faces with grooves, and a conductor held between said loaded faces in contact therewith, in combination with a series of negative-pole electrodes each composed of a conductor coated with spongy lead which forms the outer surface of the electrodes, said negative-pole electrodes being held respectively between a pair of positive-pole electrodes, in contact with the unloaded faces of the porous plates and laterally supported thereby.

In testimony whereof I have hereunto subscribed my name this 11th day of July, 1899.

GEORGE E. HATCH.

Witnesses:
E. D. CHADWICK,
J. MIDDLEBY, Jr.